United States Patent
Wang

(10) Patent No.: US 11,665,437 B2
(45) Date of Patent: May 30, 2023

(54) IMAGE PROCESSING SYSTEM, IMAGE PROCESSING APPARATUS AND IMAGE PROCESSING METHOD

(71) Applicant: ATEN International Co., Ltd., New Taipei (TW)

(72) Inventor: Li Ying Wang, New Taipei (TW)

(73) Assignee: ATEN International Co., Ltd., New Taipei (TW)

( * ) Notice: Subject to any disclaimer, the term of this patent is extended or adjusted under 35 U.S.C. 154(b) by 261 days.

(21) Appl. No.: 17/038,348

(22) Filed: Sep. 30, 2020

(65) Prior Publication Data

US 2021/0306562 A1 Sep. 30, 2021

(30) Foreign Application Priority Data

Mar. 27, 2020 (TW) .................................. 109110640

(51) Int. Cl.
*H04N 19/103* (2014.01)
*H04N 23/80* (2023.01)
*H04N 19/176* (2014.01)
*H04N 19/136* (2014.01)

(52) U.S. Cl.
CPC ........... *H04N 23/80* (2023.01); *H04N 19/103* (2014.11); *H04N 19/136* (2014.11); *H04N 19/176* (2014.11)

(58) Field of Classification Search
None
See application file for complete search history.

(56) References Cited

U.S. PATENT DOCUMENTS

| 9,641,844 B2 | 5/2017 | Kim et al. |
| 2017/0279866 A1* | 9/2017 | Bertrand ................. H04L 65/70 |
| 2019/0043201 A1 | 2/2019 | Strong et al. |
| 2020/0154039 A1* | 5/2020 | Yu ........................... G06T 5/007 |

OTHER PUBLICATIONS

Taiwanese Office Action, dated Nov. 30, 2020, in a counterpart Taiwanese patent application, No. TW 109110640.

\* cited by examiner

*Primary Examiner* — Christopher G Findley
(74) *Attorney, Agent, or Firm* — Chen Yoshimura LLP

(57) ABSTRACT

An image processing system includes an image source apparatus, an image processing apparatus and a target apparatus. The image processing apparatus includes an image capturing unit, a mode determining unit and an image compression unit. The image capturing unit captures an image provided by the image source apparatus and divides it into blocks. The mode determining unit, coupled to the image capturing unit, includes compression modes. The mode determining unit receives a first block of the blocks, and a classification model in the mode determining unit analyzes the first block, and based on the analysis result, selects a first compression mode for the first block from the compression modes. The image compression unit, coupled to the image capturing unit and the mode determining unit, compresses the first block into a first compressed block according to the first compression mode and transmits the first compressed block to the target apparatus.

14 Claims, 7 Drawing Sheets

IMAGE PROCESSING SYSTEM, IMAGE PROCESSING APPARATUS AND IMAGE PROCESSING METHOD

BACKGROUND OF THE INVENTION

Field of the Invention

This invention relates to image processing, in particular to an image processing system, image processing device and image processing method.

Description of Related Art

Generally, in image processing process, three color sampling methods commonly used in the industry are 4:4:4, 4:2:2 and 4:2:0. 4:4:4 color sampling achieves whole image transmission without channel compression, and requires a relatively large transmission bandwidth. 4:2:2 color sampling removes one half of the signals of the second and third channels, and requires ⅔ of the transmission bandwidth of the 4:4:4 color sampling method. As for 4:2:0, more blue and red chroma will be taken away, so the occupied transmission bandwidth is even smaller.

For example, if the image currently being processed is a computer desktop or a simple still image, because the compression ratio for such images is usually high, and the bandwidth occupied by the transmission is relatively small, even if uncompressed 4:4:4 color sampling method is used, the occupied bandwidth is still within an acceptable range, and will not produce distortion after image compression. Conversely, if the image currently being processed is a complex image, a compressed 4:2:2 or 4:2:0 color sampling method are often used so as to not exceed the limit of the total transmission bandwidth.

However, since it is difficult to know or predict in advance whether the image provided by the user is a simple image or a complex image, current image processing systems are not able to automatically select the most suitable color sampling method based on the complexity of the image current being process, and therefore cannot both meet the bandwidth limitation and avoid image distortion at the same time.

SUMMARY

In view of this, the present invention provides an image processing system, image processing device and image processing method which obviates the problems encountered in the conventional art.

An embodiment of the present invention provides an image processing device. In this embodiment, the image processing device includes an image capturing unit, a mode determining unit, and an image compression unit. The image capturing unit captures the image and divides the image into a plurality of blocks. The mode determining unit is coupled to the image capturing unit. The mode determining unit includes a plurality of compression modes. The mode determining unit receives a first block among the blocks, analyzes the first block by a classification model of the mode determining unit, and based on the analysis result, selects a first compression mode for the first block from the multiple compression modes. The image compression unit is coupled to the image capturing unit and the mode determining unit. The image compression unit compresses the first block according to the first compression mode to generate a first compressed block.

In one embodiment, the classification model is an artificial intelligence (AI) model obtained through a training mechanism. The training of the classification model uses training data that includes a plurality of sample images, preferably labeled by complexity.

In one embodiment, the mode determining unit inputs the first block to the classification model, and selects the first compression mode for the first block from the multiple compression modes based on the complexity result output by the classification model.

In one embodiment, the first compressed block further includes compression information corresponding to the first compression mode.

In one embodiment, the mode determining unit obtains a second block from the blocks, analyzes the second block by the classification model, and based on the analysis result, selects a second compression mode for the second block from the multiple compression modes. The image compression unit compresses the second block according to the second compression mode to generate the second compressed block. The second block is different from the first block.

In one embodiment, the first compression mode and the second compression mode are different and use different color sampling methods.

Another embodiment of the present invention provides an image processing system. In this embodiment, the image processing system includes an image source device, an image processing device, and a target device. The image source device provides images. The image processing device is coupled to the image source device. The image processing device includes an image capturing unit, a mode determining unit, and an image compression unit. The image capturing unit receives the image from the image source device and divides the image into a plurality of blocks. The mode determining unit is coupled to the image capturing unit. The mode determining unit includes a plurality of compression modes. The mode determining unit receives a first block among the blocks, analyzes the first block by a classification model of the mode determining unit, and based on the analysis result of the classification model, selects a first compression mode for the first block from the multiple compression modes. The image compression unit is coupled to the image capturing unit and the mode determining unit. The image compression unit compresses the first block according to the first compression mode to generate a first compressed block. The target device is coupled to the image compression unit of the image processing device and receives the first compressed block. The target device selects a first decompression mode corresponding to the first compression mode based on the compression information, and decompresses the first compressed block according to the first decompression mode.

Another embodiment of the present invention provides an image processing method. In this embodiment, the image processing method includes the following steps: capturing an image; dividing the image into a plurality of blocks; selecting a first block among the blocks; analyzing the first block; based on the analysis result, selecting a first compression mode for the first block from a plurality of compression modes; and compressing the first block according to the first compression mode to generate a first compressed block.

Compared with the conventional art, the image processing system, image processing device, and image processing method according to embodiments of the present invention can use a classification model (such as an artificial neural network obtained through deep learning) to automatically determine the complexity of an image block (such as complex image, medium image, or simple image), and can further select a compression mode that is most suitable for the image block based on the determined complexity. Therefore, the system, device and method can not only meet the bandwidth limitation, but also avoid image distortion perceived by human eyes.

The advantages and spirit of the present invention can be further understood through the following detailed description of the invention and the accompanying drawings.

DETAILED DESCRIPTION OF PREFERRED EMBODIMENTS

Figure 1:
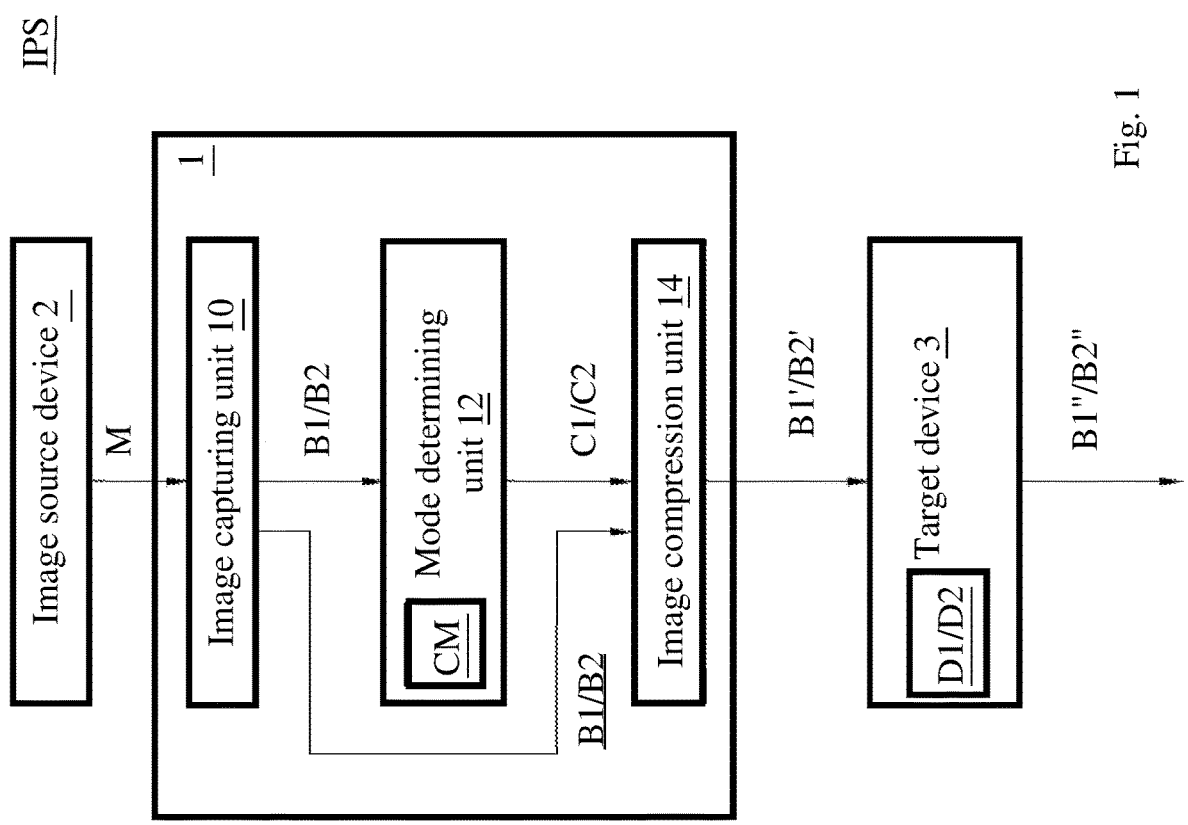
FIG. 1 is a functional block diagram of an image processing system according to a preferred embodiment of the present invention.

Reference will now be made in detail to exemplary embodiments of the present invention, and examples of the exemplary embodiments will be described with the accompanying drawings. Elements/components with the same or similar reference numerals used in the drawings and embodiments are used to represent the same or similar parts.

One preferred embodiment of the present invention provides an image processing system. In this embodiment, the image processing system is used to perform image processing procedures on the images to generate processed images.

Please refer to FIG. 1, which is a functional block diagram of an image processing system in a preferred embodiment. As shown in FIG. 1, the image processing system IPS includes an image processing device 1, an image source device 2, and a target device 3. The image processing device 1 is coupled between the image source device 2 and the target device 3. The image source device 2 may be, for example, a computer, video player, video signal switch, etc. The target device 3 may be, for example, a display device such as a monitor, TV, projector, etc. The image processing device 1, including each of its components described below, may be implemented by electrical circuitry including logic circuits such as FPGA, and/or processors or which execute computer executable program code stored in computer readable non-volatile memories.

In this embodiment, the image source device 2 provides an image M to the image processing device 1. The image processing device 1 compresses the image M provided by the image source device 2 to generate a first compressed block B1' and a second compressed block B2' and outputs them to the target device 3.

In one embodiment, the image processing device 1 includes an image capturing unit 10, a mode determining unit 12, and an image compression unit 14. The mode determining unit 12 is connected to the image capturing unit 10, and the image compression unit 14 is coupled to the image capturing unit 10 and the mode determining unit 12.

In one embodiment, the mode determining unit 12 includes a plurality of compression modes (e.g., it stores information regarding a plurality of compression modes). The compression modes include a first compression mode C1 and a second compression mode C2, but the invention is not limited to this. In addition, the mode determining unit 12 also includes a classification model CM, the details of which will be described in detail later.

The image capturing unit 10 receives the image M from the image source device 2 and divides the image M into a plurality of blocks, and the blocks include, without limitation, at least a first block B1 and a second block B2. The shapes of the first block B1 and the second block B2 may be the same or different, and the invention is not limited thereto. The areas of the first block B1 and the second block B2 may be equal or unequal, and the present invention is not limited thereto.

Here, when the mode determining unit 12 receives the first block B1 from the image capturing unit 10, the classification model CM analyzes the first block B1, and based on the analysis result, selects from the multiple compression modes in the mode determining unit 12 a first compression mode C1 for the first block B1, and outputs the first compression mode C1 to the image compression unit 14 (e.g. it outputs an indication that the first compression mode is selected).

More specifically, when the mode determining unit 12 receives the first block B1, the mode determining unit 12 inputs the first block B1 to the classification model CM. The classification model CM performs an analysis operation on the first block B1 to produce a complexity result of the first block B1. Then, from the multiple compression modes, the mode determining unit 12 selects a first compression mode C1 that corresponds to the complexity result of the first block B1 (e.g., the mode determining unit 12 may store a lookup table that relates each possible complexity result to a compression mode).

Next, the image compression unit 14 receives the first block B1 from the image capturing unit 10 and the first compression mode C1 from the mode determining unit 12. The image compression unit 14 compresses the first block B1 according to the first compression mode C1 to generate a first compressed block B1', and output the first compressed block B1' to the target device 3. (Here, note that the image compression unit 14 pre-stores multiple compression algorithms, and will select one algorithm according to the compression mode indication received from the mode determining unit 12.) The first compressed block B1' may include compression information corresponding to the first compression mode C1. For example and without limitation, the compression information may include information such as the color sampling method and the compression ratio adopted by the first compression mode C1.

Upon receiving the first compressed block B1', the target device 3 selects a corresponding first decompression mode D1 according to the compression information included in the first compressed block B1', and decompresses the first compressed block B1' according to the first decompression mode D1 to generate a first restored block B1". Since the compression information includes information regarding the first compression mode C1, the target device 3 can select, among the decompression modes, the first decompression mode D1 corresponding to the first compression mode C1 based on the compression information. The above functions of the target device 3 is implemented by electrical circuitry including logic circuits such as FPGA, and/or processors which execute computer executable program code stored in computer readable non-volatile memories. The target device 3 pre-stores the multiple decompression algorithms.

Figure 2:
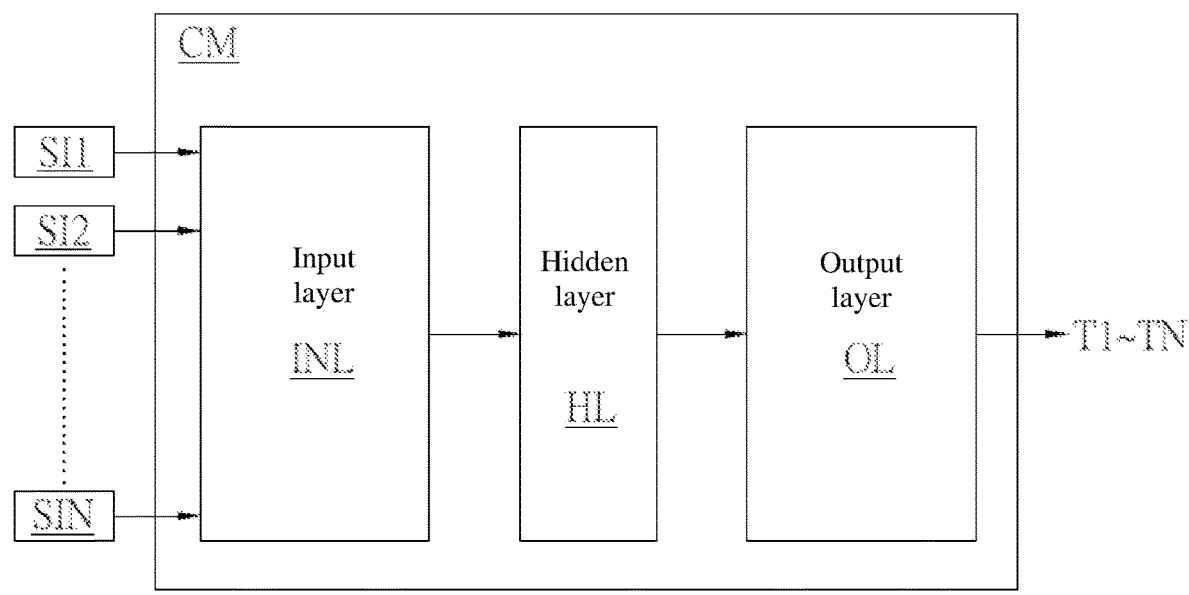
FIG. 2 is a schematic diagram showing a classification model of the embodiment.

In an embodiment, the classification model CM may be an artificial neural network obtained through deep learning. For example, during training of the neural network, N sample images (N is a positive integer) SI1~SIN are inputted to the classification model CM being trained, so that the classification model CM can continuously adjust its internal parameters by analyzing each sample image SI1~SIN during the training process. After training, the trained classification model CM can be used to analyze new images inputted into it and outputs the complexity results of the input images. In the present embodiment, the training method is not limited to any particular training method. Referring to FIG. 2, the neural network of the classification model CM has multiple connected layers of nodes, including an input layer INL, one or more hidden layers HL, and an output layer OL. The input layer INL is coupled to the hidden layer HL and the hidden layer HL is coupled to the output layer OL.

More specifically, when training the classification model CM, the first sample image SI1 of the N sample images SI1~SIN is inputted to the classification model CM. When the input layer INL receives the first sample image SI1, the input layer INL transmits the first sample image SI1 to the hidden layer HL. Next, the hidden layer HL uses algorithms such as convolution, pooling, or fully connected to process the first sample image SI1 to generate a complexity result T1 for the first sample image SI1, and outputs the complexity result via the output layer OL. The output is fed back to the classification model CM, and the classification model CM then adjusts the internal parameters of any one or any combination of the input layer INL, the hidden layer HL, and the output layer OL based on the feedback. Preferably, in supervised training, the training samples are associated with training labels which indicate the correct complexity values for each sample image, and the feedback is generated based on a comparison of the complexity result outputted by the model and the training label of the sample image SI1. It should be noted that because the classification model CM is still in the process of training, the complexity result T1 output by the output layer OL may not be correct, and when the result of the output layer OL is wrong, the feedback is used to adjust the internal parameters of the input layer INL, the hidden layer HL, and/or the output layer OL to improve the model.

This process is repeated using labeled sample image SI2 of the N sample images SI1~SIN, by inputting the sample image SI2 to the classification model CM having the previously adjusted internal parameters. The internal parameters are further adjusted based on the processing of the sample image SI2 in similar manners as described above.

Similarly, the third sample image SI3 to the Nth sample image SIN are fed to the classification model CM and processed in the same way to further adjust the internal parameters of the input layer INL, the hidden layer HL, and/or the output layer OL. The final result is a trained classification model CM, which can be used to process new input images that were not used in training to accurately generate the complexity result of the new input image.

Figure 3A:
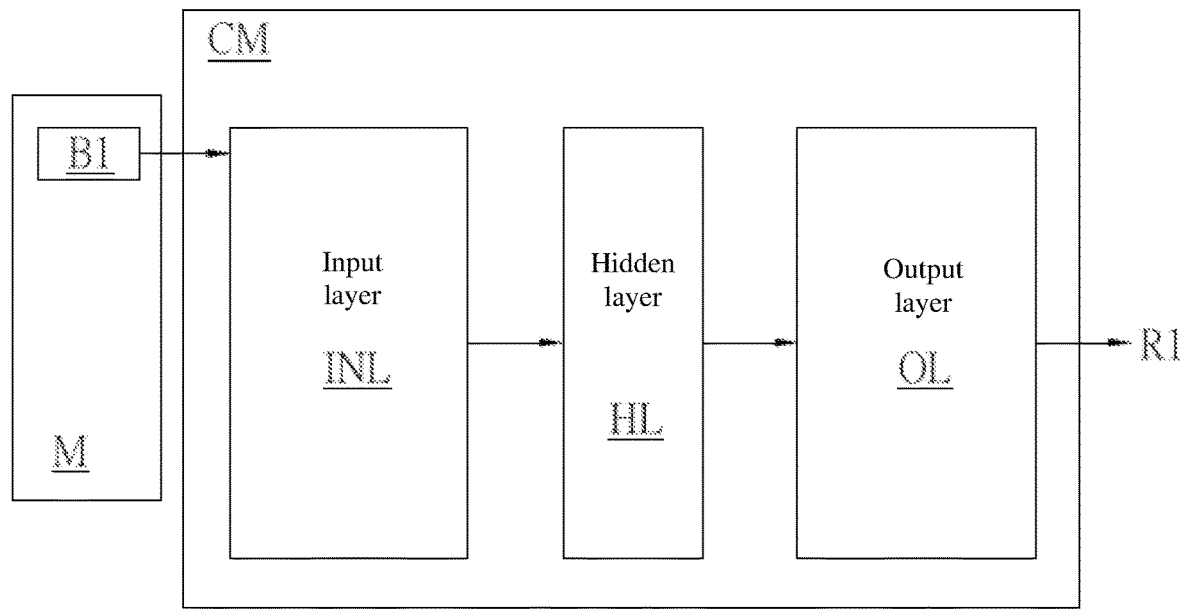
FIGS. 3A and 3B are schematic diagrams respectively showing that the classification model receives different blocks of the image to be processed and correspondingly outputs the complexity results of the different blocks.
Figure 3B:
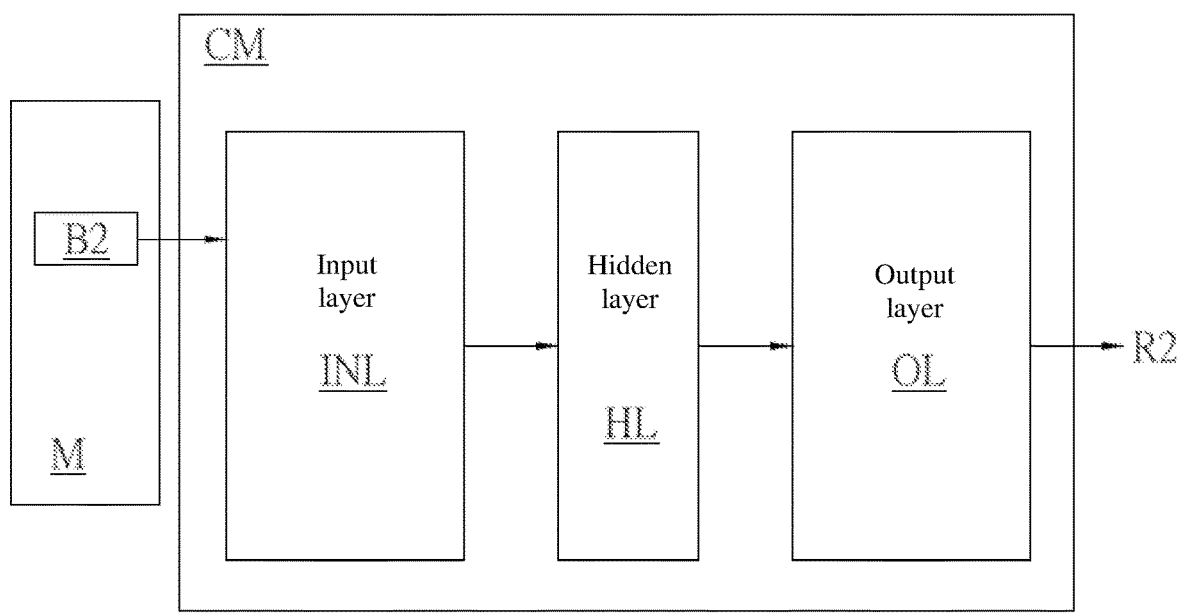

Next, please refer to FIGS. 3A and 3B. FIGS. 3A and 3B are schematic diagrams respectively showing that the trained classification model CM receives different blocks of the image M to be processed and correspondingly outputs the complexity results of the different blocks.

As shown in FIG. 3A, when the input layer INL of the trained classification model CM receives the first block B1 of the image M, its hidden layer HL operates on the first block B1 using the internal parameters obtained through training, to generate the complexity result R1 of the block B1 which is output through the output layer OL. Based on the complexity result R1, the mode determining unit 12 selects a first compression mode C1 corresponding to the complexity result R1 from (K+1) compression modes C0 to CK. Here, the first compression mode C1 of this embodiment is only used as an example for illustration, and actually the nth compression mode Cn is selected according to the first block B1, where n is any integer from 0 to K.

Similarly, as shown in FIG. 3B, when the input layer INL of the trained classification model CM receives the second block B2 of the image M (different from the first block B1), its hidden layer HL operates on the second block B2 using the internal parameters obtained through training, to generate the complexity result R2 of the second block B2 which is output through the output layer OL. Based on the complexity result R2, the mode determining unit 12 selects a second compression mode C2 corresponding to the complexity result R2 from the (K+1) compression modes C0 to CK. Here, the second compression mode C2 of this embodiment is only used as an example for illustration, and actually the nth compression mode Cn is selected according to the second block B2, where n is any integer from 0 to K.

In practical applications, if the complexity result R2 of the second block B2 is different from the complexity result R1 of the first block B1, the second block B2 will be compressed according to the second compression mode C2 that is different from the first compression mode C1 used to compress the first block B1. On the other hand, if the complexity result R2 of the second block B2 is equal to the complexity result R1 of the first block B1, the second block B2 will be compressed using the same first compression mode C1 as used for the first block B1.

It should be noted that the complexity result R1 of the first block B1 and the complexity result R2 of the second block B2 can be complex image, medium image, and simple image in terms of complexity, and each has its own corresponding compression mode that is suitable for the complexity result. The compression mode can be, without limitation, lossy compression or lossless compression. Many lossless compression methods and lossy compression methods with different degrees of compression are known and their details are not described here.

In addition, in the first compression mode C1 or the second compression mode C2, a complete color sampling method (e.g. 4:4:4) or a reduced-size color sampling method (e.g. 4:2:2 or 4:2:0) may be used to perform color sampling, so that the first restored block B1" and the second restored block B2" obtained by the target device 3 after decompression may be the same as or different from the respective uncompressed first block B1 and uncompressed second blocks B2 received by the mode determining unit 12.

Taking the first block B1 as an example, if the complexity result R1 of the first block B1 output by the classification model CM is "simple image", indicating that the bandwidth occupied by the first block B1 during transmission would be relatively small and it is suitable to be compressed with a lossless compression mode, the mode determining unit 12 selects lossless compression as the first compression mode C1 for the image compression unit 14 to compress the first block B1, and to use a complete color sampling method (e.g. 4:4:4) to perform color sampling. Therefore, the first restored block B1" obtained after the target device 3 performs decompression will be the same as the uncompressed first block B1 received by the mode determining unit 12.

Conversely, if the complexity result R1 of the first block B1 output by the classification model CM is a "complex image", indicating that the bandwidth occupied by the first block B1 during transmission would be relatively large and it is suitable for a lossy compression mode with a greater degree of compression, the mode determining unit 12 selects a lossy compression with a greater degree of compression as the first compression mode C1 for the image compression unit 14 to compress the first block B1, and to use a color sampling method with more size reduction (e.g. 4:2:0) to performs color sampling. Therefore, the first restored block B1" obtained after the target device 3 performs decompression will be different from the uncompressed first block B1 received by the mode determining unit 12.

In addition, if the complexity result R1 of the first block B1 output by the classification model CM is "medium image", indicating that the bandwidth occupied by the first block B1 during transmission would be smaller than that by the "complex image" and it is suitable for a lossy compression mode with a lesser degree of compression, the mode determining unit 12 selects a lossy compression with a lesser degree of compression as the first compression mode C1 for the image compression unit 14 to compress the first block B1, and to use a color sampling method with less size reduction (e.g. 4:2:2) to performs color sampling. Therefore, the first restored block B1" obtained after the target device 3 performs decompression will also be different from the uncompressed first block B1 received by the mode determining unit 12. As for the second block B2, the situations can be similarly understood, and will not be repeated here.

As can be seen from the above, the mode determining unit 12 in the image processing device 1 can select, based on the complexity result R1 and R2 (e.g. complex image, medium image or simple image) of the first block B1 and second block B2 of the image M, a suitable first compression mode C1 and a suitable second compression mode C2 (such as lossless compression or lossy compression with different degrees of compression) for the image compression unit 14 to use to compress the first block B1 and the second block B2, and to use, corresponding to the first compression mode C1 and second compression mode C2, a complete color sampling method (e.g. 4:4:4) or a color sampling method with different size reduction (e.g. 4:2:2 or 4:2:0) to perform color sampling. This way, the transmission not only meets the bandwidth limitation, but also prevents image distortion perceived by human eyes.

It should be noted that although the above embodiment takes the first block B1 and the second block B2 of the image M as examples for description, in practice, the processing of other blocks of the image M are similar and can be understood similarly, and no further details is described here.

Another embodiment of the present invention is an image processing device. As shown in FIG. 1, in this embodiment, the image processing device 1 can be coupled between the image source device 2 and the target device 3, but it is not limited to this. The image processing device 1 may include an image capturing unit 10, a mode determining unit 12, and an image compression unit 14. The mode determining unit 12 includes a classification model CM. The mode determining unit 12 is coupled to the image capturing unit 10; the image compression unit 14 is coupled to the image capturing unit 10 and the mode determining unit 12. The image capturing unit 10 captures the image M played by the image source device 2 and divides the image M into a plurality of blocks B1 and B2. The mode determining unit 12 receives the first block B1 of the blocks B1 and B2, and selects a first compression mode C1 for the first block B1 from the plurality of compression modes based on the output of the classification model CM. The image compression unit 14 compresses the first block B1 according to the first compression mode C1 to generate the first compressed block B1'. Similarly, the mode determining unit 12 receives the second block B2 of the blocks B1 and B2, and selects a second compression mode C2 for the second block B2 from the plurality of compression modes based on the output of the classification model CM. The image compression unit 14 compresses the second block B2 according to the second compression mode C2 to generate the second compressed block B2'. As for the operation of each unit of the image processing device 1, please refer to the above related text and diagram description, which will not be repeated here.

Another embodiment of the present invention is an image processing method. In this embodiment, the image processing method can be performed by an image processing device to process the image to generate the processed image. The image processing system may include an image processing device, an image source device, and a target device, and the image processing device may be coupled between the image source device and the target device, without limitation.

Figure 4:
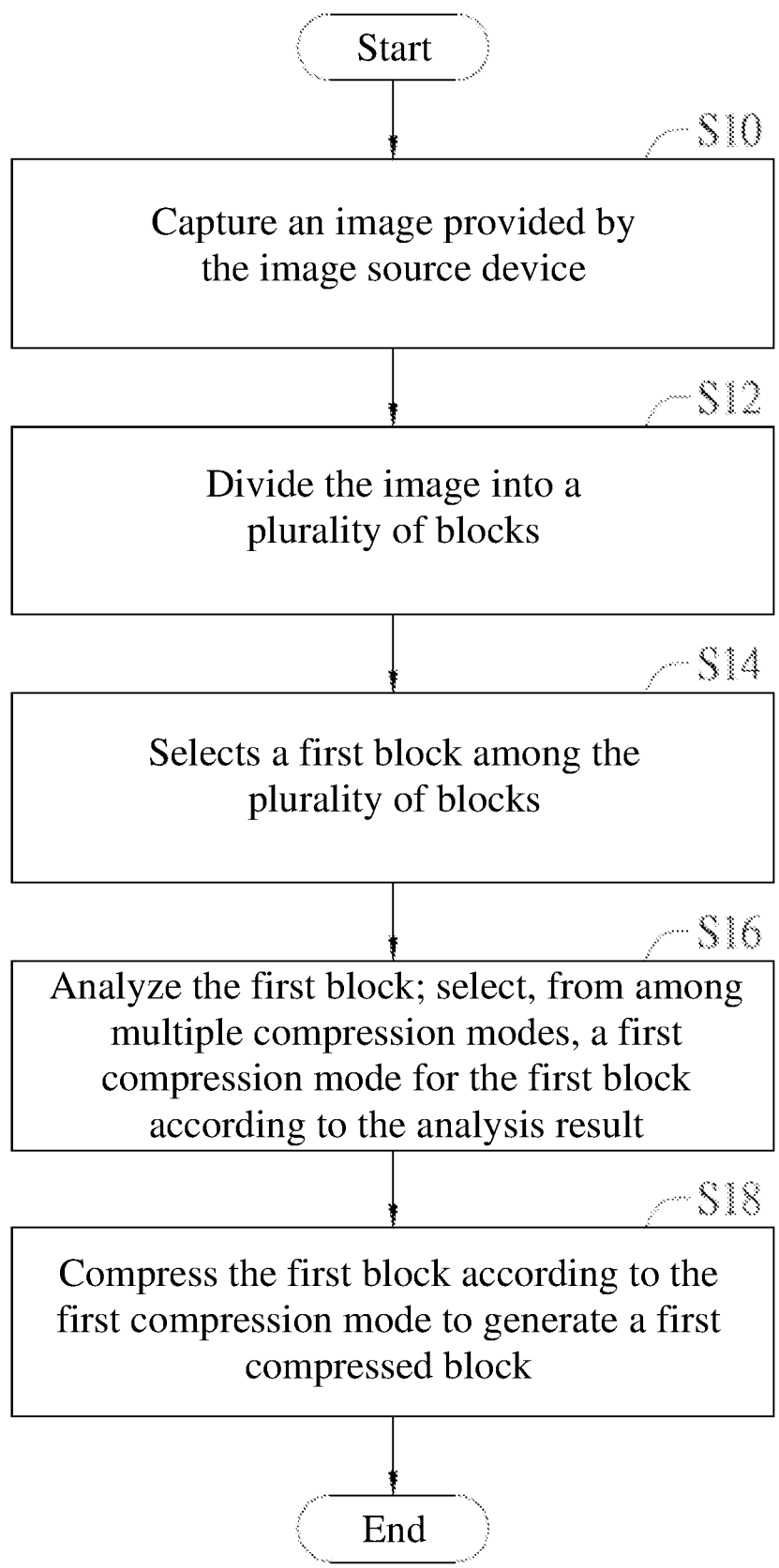
FIG. 4 is a flowchart illustrating an image processing method according to another preferred embodiment of the present invention.

Please refer to FIG. 4, which illustrates the image processing method in this embodiment. As shown in FIG. 4, the image processing method may include steps S10 to S18.

First, the image processing method captures the image provided by the image source device (step S10) and divides the image into a plurality of blocks (step S12), wherein the blocks include at least a first block and a second block different from each other, without limitation. Then, the image processing method selects the first block among the blocks (step S14), analyzes the first block, and selects, from among multiple compression modes, a first compression mode for the first block according to the analysis result (Step S16), and then compress the first block according to the first compression mode to generate a first compressed block (step S18).

Figure 5:
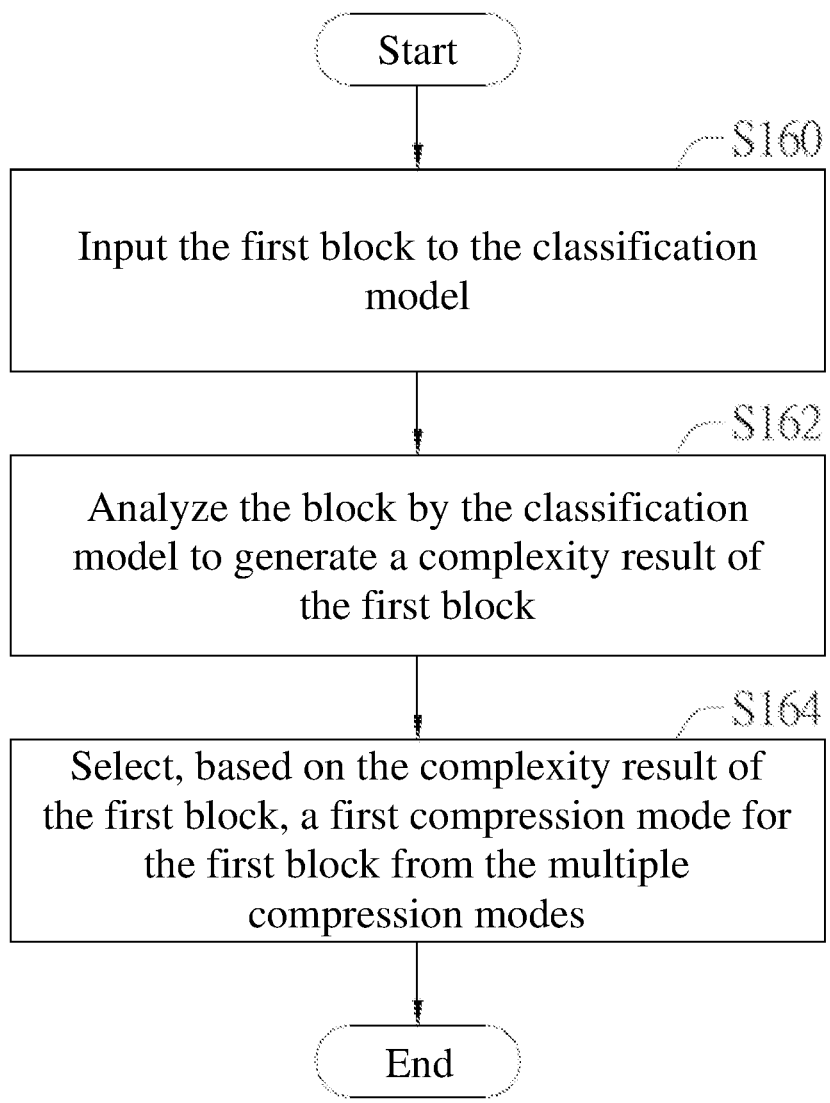
FIG. 5 is a flow chart illustrating that step S16 in FIG. 4 may further include steps S160-S164.

More specifically, after the image processing method performs step S14 to select the first block, as shown in FIG. 5, in step S16, the image processing method inputs the first block to the classification model (step S160) and analyzes the block using the classification model to generate a complexity result of the first block (step S162). Next, the image processing method selects, based on the complexity result of the first block, a first compression mode for the first block from the multiple compression modes (step S164).

It should be noted that the classification model described in step S160 may be an artificial neural network obtained through deep learning, for example, by inputting a plurality of sample images to the classification model to be trained, so that in the training process, the classification model continuously adjusts its internal parameters based on the feedback of the training complexity results of each sample image, thereby obtaining a trained classification model that is more accurate in processing new input image that have not been used as training data. In addition, in step S164, the complexity result of the first block can be complex image, medium image, or simple image in terms of complexity level, and each corresponding to its own suitable compression mode, but it is not limited to this.

Figure 6:
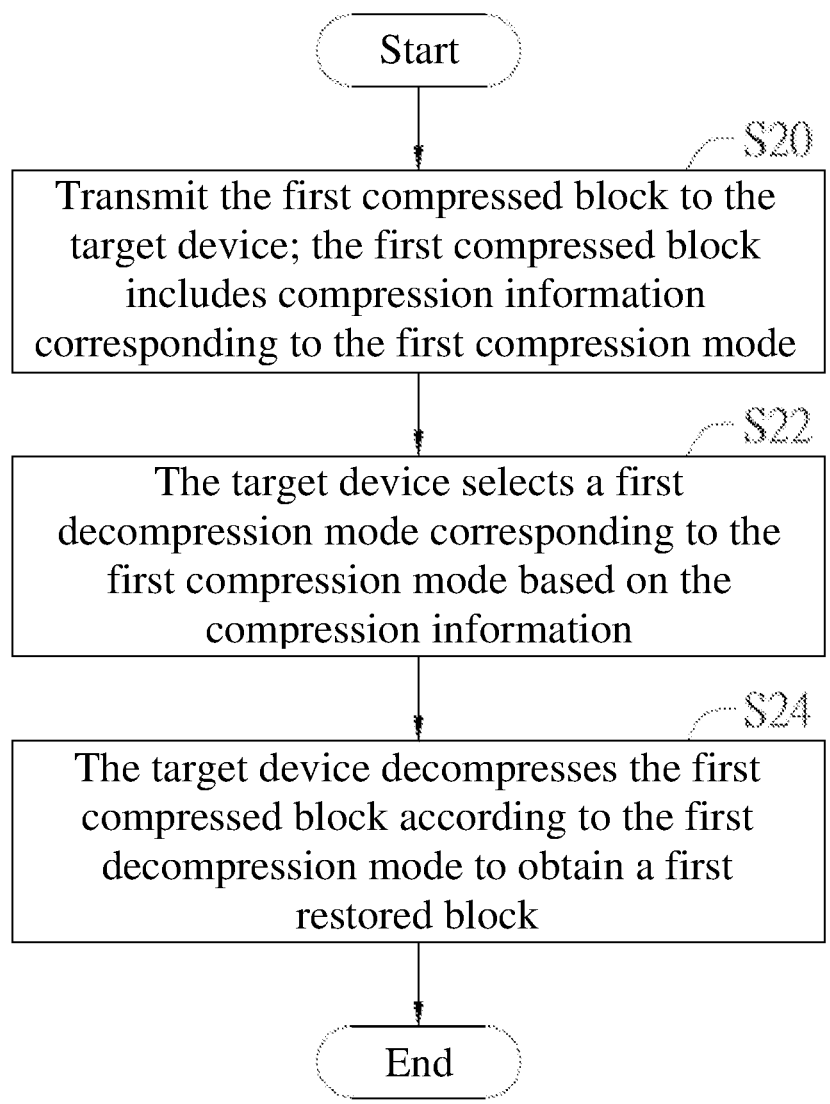
FIG. 6 is a flowchart illustrating that steps S20 to S24 can be further performed after the image processing method completes step S18 in FIG. 4.

In one embodiment, after the image processing method executes step S18 to compress the first block according to the first compression mode to generate the first compressed block, as shown in FIG. 6, the image processing method transmits the first compressed block to the target device, where the first compressed block further includes compression information corresponding to the first compression mode (step S20). Then, the target device selects a first decompression mode corresponding to the first compression mode based on the compression information (step S22), and decompresses the first compressed block according to the first decompression mode to obtain the first restored block (Step S24).

It should be noted that the first compression mode may be a lossy compression or a lossless compression, and in the first compression mode, the color sampling method may be a complete color sampling method (e.g. 4:4:4) or a reduced-size color sampling method (e.g. 4:2:2 or 4:2:0), so that the first restored block obtained after decompression in step S24 may be the same as or different from the first uncompressed first block selected in step S14.

More specifically, if the first compression mode is lossy compression and the color sampling is a reduced-size color sampling method (e.g. 4:2:2 or 4:2:0), then the first restored block obtained after decompression in step S24 will be different from the uncompressed first block selected in step S14; and if the first compression mode is a lossless compression and the color sampling is a complete color sampling method, then the first restored block will be the same as the uncompressed first block selected in step S14.

For example, if the complexity result of the first block is "simple image", indicating that the bandwidth occupied by the first block during transmission would be relatively small and it is suitable to be compressed with a lossless compression mode, the image processing method selects a lossless compression as the first compression mode to compress the first block, and uses a complete color sampling method (e.g. 4:4:4) to perform color sampling. Therefore, the first restored block obtained after decompression in step S24 will be the same as the uncompressed first block selected in step S14.

Conversely, if the complexity result of the first block is "complex image", indicating that the bandwidth occupied by the first block during transmission would be relatively large and it is suitable to be compressed in a lossy compression mode with a greater degree of compression, the image processing method selects a lossy compression with a greater degree of compression as the first compression mode to compress the first block, and uses a color sampling method with more size reduction (such as 4:2:0) to perform color sampling. Therefore, the first restored block obtained after decompression in step S24 will be different from the uncompressed first block selected in step S14.

In addition, if the complexity result of the first block is "medium image", indicating that the bandwidth occupied by the transmission of the first block would be smaller than that by the "complex image" and it is suitable for a lossy compression mode with a lesser degree of compression, the image processing method selects the lossy compression with a lesser degree of compression as the first compression mode to compress the first block, and uses a color sampling method with less size reduction (e.g. 4:2:2) to perform color sampling. Therefore, the first restored block obtained after decompression in step S24 will also be different from the uncompressed first block selected in step S14.

Figure 7:
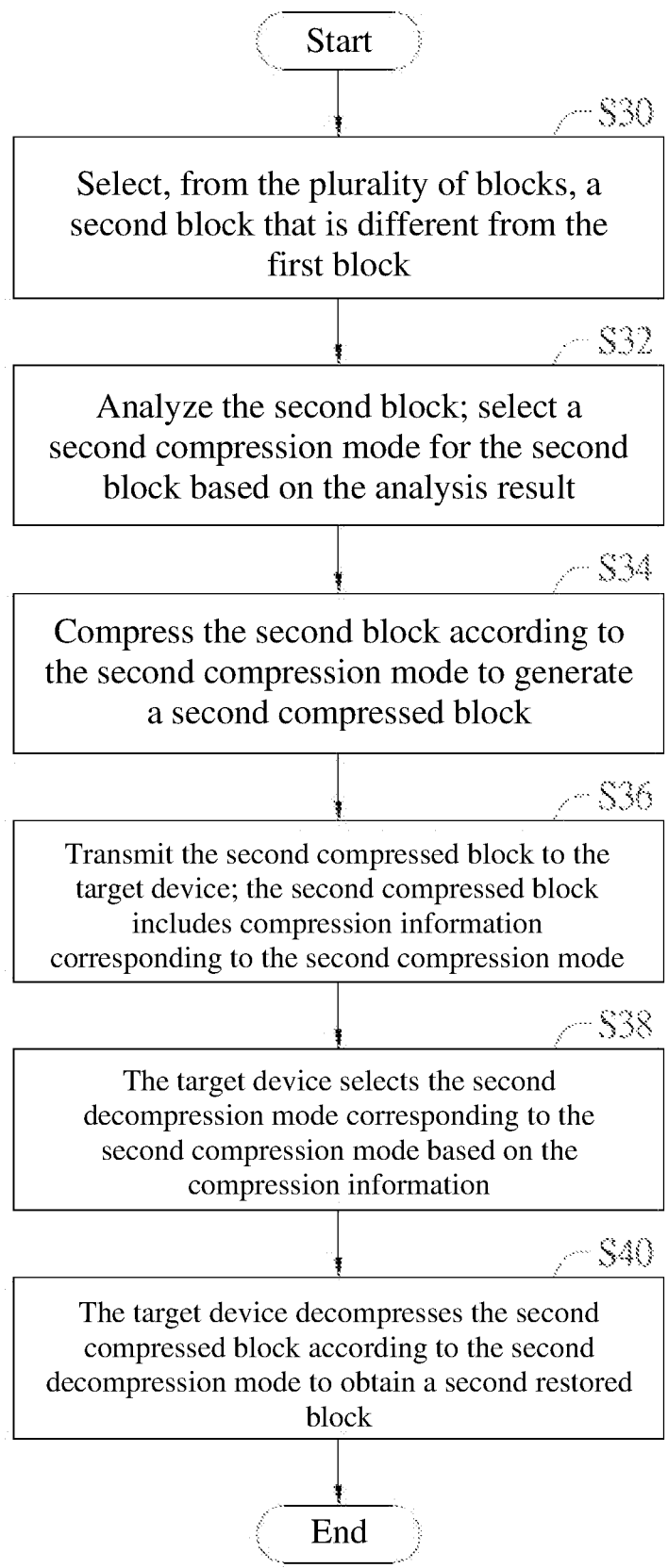
FIG. 7 is a flowchart illustrating that steps S30 to S40 can be further performed after the image processing method completes step S18 in FIG. 4.

Similarly, as shown in FIG. 7, the image processing method may select, from the plurality of blocks, a second block that is different from the first block (step S30), analyze the second block, and select a second compression mode for the second block based on the analysis result (step S32). Next, the image processing method compresses the second block according to the second compression mode to generate a second compressed block (step S34), and transmits the second compressed block to the target device, where the second compressed block also includes compression information corresponding to the second compression mode (step S36). Then, the target device selects the second decompression mode corresponding to the second compression mode based on the compression information (step S38), and decompresses the second compressed block according to the second decompression mode to obtain the second restored block (Step S40).

It can be seen from the above that the image processing method of the present embodiment can select, based on the complexity results (e.g. complex image, medium image or simple image) of the first block and second block of the image, a suitable first compression mode and second compression mode (such as lossless compression or lossy compression with different degrees of compression) to be used to compress the first block and the second block, and also to use, corresponding to the first compression mode and second compression mode, a complete color sampling method (e.g. 4:4:4) or a color sampling method with different size reduction (e.g. 4:2:2 or 4:2:0) to perform color sampling. This way, the transmission not only meets the bandwidth limitation, but also prevents image distortion perceived by human eyes.

It should be noted that although the above embodiment takes the first block and the second block of the image as examples for description, in practice, the processing of other blocks of the image are similar and can be understood similarly, and no further details is described here.

Compared with the conventional art, the image processing system, image processing device and image processing method of embodiments of the present invention can use a classification model (such as an artificial neural network obtained through deep learning) to automatically process the current image block to determine the complexity result of the image block (such as complex image, medium image, or simple image), and based thereon, to select a compression mode that is the most suitable for the image block. The technology can not only meet the bandwidth limitation, but also avoid image distortion perceived by the human eyes.

It will be apparent to those skilled in the art that various modification and variations can be made in the image processing system, device and method of the present invention without departing from the spirit or scope of the invention. Thus, it is intended that the present invention cover modifications and variations that come within the scope of the appended claims and their equivalents.

What is claimed is:
1. An image processing device, comprising:
an image capturing unit, configured to capture an image and divide the image into a plurality of blocks;
a mode determining unit, having multiple compression modes, coupled to the image capturing unit, configured to receive a first block among the plurality of blocks, the mode determining unit including a classification model configured to analyze the first block, the mode determining unit further being configured to, based on an analysis result from the classification model, select a first compression mode for the first block from the multiple compression modes; and
an image compression unit, coupled to the image capturing unit and the mode determining unit, configured to compresses the first block according to the first compression mode to generate a first compressed block,
wherein the mode determining unit is further configured to obtain a second block from the plurality of blocks, analyze the second block by the classification model, and based on an analysis result, select a second compression mode for the second block from the multiple compression modes,
wherein the image compression unit is further configured to compress the second block according to the second compression mode to generate the second compressed block, and wherein the second block is different from the first block, and the second compression mode is different from the first compression mode.

2. The image processing device of claim 1, wherein the classification model is an artificial intelligence (AI) model obtained through training, wherein during training, the classification model receives a plurality of sample images as input and outputs complexity results.

3. The image processing device of claim 1, wherein the mode determining unit is configured to input the first block to the classification model, and to select the first compression mode for the first block from the multiple compression modes based on a complexity result of the first block output by the classification model.

4. The image processing device of claim 1, wherein the first compressed block further includes compression information corresponding to the first compression mode.

5. The image processing device of claim 1, wherein the first compression mode and the second compression mode use different color sampling methods.

6. An image processing system, comprising:
an image source device, configured to provide an image;
an image processing device, coupled to the image source device, and including:
    an image capturing unit, coupled to the source device, and configured to receive the image from the image source device and divide the image into a plurality of blocks;
    a mode determining unit, having multiple compression modes, coupled to the image capturing unit, configured to receive a first block among the plurality of blocks, the mode determining unit including a classification model configured to analyze the first block, the mode determining unit further configured to, based on an analysis result from the classification model, select a first compression mode for the first block from the multiple compression modes; and
    an image compression unit, coupled to the image capturing unit and the mode determining unit, configured to compresses the first block according to the first compression mode to generate a first compressed block, wherein the first compressed block further includes compression information corresponding to the first compression mode;
wherein the mode determining unit is further configured to obtain a second block from the plurality of blocks, analyze the second block by the classification model, and based on an analysis result, select a second compression mode for the second block from the multiple compression modes,
wherein the image compression unit is further configured to compress the second block according to the second compression mode to generate the second compressed block, and wherein the second block is different from the first block, and the second compression mode is different from the first compression mode, and
a target device, coupled to the image compression unit of the image processing device, configured to receive the first compressed block, to select a first decompression mode corresponding to the first compression mode based on the compression information, and to decompress the first compressed block according to the first decompression mode.

7. The image processing system of claim 6, wherein the mode determining unit is configured to input the first block to the classification model, and select the first compression mode for the first block from the multiple compression modes based on a complexity result output by the classification model.

8. The image processing system of claim 6, wherein the first compression mode and the second compression mode use different color sampling methods.

9. An image processing method, comprising:
capturing an image;
dividing the image into a plurality of blocks;
selecting a first block among the blocks;
analyzing the first block;
based on an analysis result, selecting a first compression mode for the first block from a plurality of compression modes;
compressing the first block according to the first compression mode to generate a first compressed block;
selecting a second block among the blocks, the second block being different from the first block;
analyzing the second block;
based on an analysis result, selecting a second compression mode for the second block from the plurality of compression modes; and
compressing the second block according to the second compression mode to generate a second compressed block, wherein the second compression mode is different from the first compression mode.

10. The image processing method of claim 9, wherein the first compression mode and the second compression mode use different color sampling methods.

11. The image processing method of claim 9, wherein the first compressed block further includes compression information corresponding to the first compression mode, the method further comprising:
transmitting the first compressed block to a target device;
the target device selecting a first decompression mode corresponding to the first compression mode based on the compression information; and
the target device decompressing the first compressed block according to the first decompression mode.

12. The image processing method of claim 9, further comprising:
inputting the first block to a classification model;
the classification model analyzing the block to produce a complexity result of the first block;
selecting, based on the complexity result of the first block, the first compression mode for the first block from the multiple compression modes.

13. The image processing method of claim 9, further comprising:
obtaining the classification model through artificial intelligence (AI) training, wherein during training, the classification model receives a plurality of sample images and outputs complexity results.

14. The image processing method of claim 9, further comprising:
under the first compression mode, performing sampling of the first block using either a complete color sampling method or a reduced-size color sampling method.

* * * * *